(12) United States Patent
Kramer et al.

(10) Patent No.: US 6,504,572 B2
(45) Date of Patent: Jan. 7, 2003

(54) CIRCUIT FOR DETECTING LEAKY ACCESS SWITCHES IN CMOS IMAGER PIXELS

(75) Inventors: Alan H. Kramer, Berkeley, CA (US); Roberto Rambaldi, Bologna (IT); Marco Tartagni, Meldola (IT)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 08/964,762

(22) Filed: Nov. 5, 1997

(65) Prior Publication Data

US 2002/0030753 A1 Mar. 14, 2002

(51) Int. Cl.$^7$ .............................. H04N 3/14; H04N 9/64
(52) U.S. Cl. .................... 348/246; 348/310; 250/208.1; 250/214 R
(58) Field of Search .......................... 250/208.1, 338.1, 250/338.4, 349, 370.01; 348/207, 222, 241, 243, 246, 250, 294, 302, 307, 308, 309, 310, 311, 312; 382/254, 272, 275; H04N 3/14, 9/64

(56) References Cited

U.S. PATENT DOCUMENTS

| | | | |
|---|---|---|---|
| 5,153,421 A | * 10/1992 | Tandon et al. | 348/243 |
| 5,168,379 A | * 12/1992 | Mori et al. | 348/250 |
| 5,451,768 A | * 9/1995 | Hosier et al. | 250/208.1 |
| 5,532,484 A | 7/1996 | Sweetser et al. | 250/332 |
| 5,543,838 A | * 8/1996 | Hosier et al. | 348/311 |
| 5,654,537 A | * 8/1997 | Prater | 250/208.1 |
| 5,886,353 A | * 3/1999 | Spivey et al. | 250/208.1 |
| 5,933,190 A | * 8/1999 | Dierickx et al. | 348/308 |
| 5,962,846 A | * 10/1999 | Goosen | 250/208.1 |
| 6,057,539 A | * 5/2000 | Zhou et al. | 205/208.1 |

FOREIGN PATENT DOCUMENTS

DE        196 26 427        1/1997

OTHER PUBLICATIONS

*Patent Abstracts of Japan*, "Semiconductor Device," vol. 018, No. 654, Dec. 12, 1994.

Eiji Oba, et al., "A 1/4 Inch 330k Square Pixel Progressive Scan CMOS Active Pixel Image Sensor," Feb. 7, 1997, *Digest of Technical Papers*, 1997 IEEE Intntl. Solid–State Circuits Conf., pp. 180–181.

McGrath, R. Daniel, et al., "Current–Mediated, Current–Reset 768×512 Active Pixel Sensor Array," Feb. 7, 1997, *Digest of Technical Papers*, 1997 IEEE Intntl. Solid–State Circuits Conf., pp. 182–183.

Eric R. Fossum, "CMOS Image Sensors: Electronic Camera On a Chip," Dec. 10–13, 1995,*International Electron Devices Meeting Technical Digest*, pp. 17–25.

\* cited by examiner

*Primary Examiner*—Ngoc-Yen Vu
(74) *Attorney, Agent, or Firm*—Lisa K. Jorgenson; Jeffrey K. Weaver

(57) ABSTRACT

Disclosed is a CMOS image sensor that includes circuitry for identifying defective pixels, particularly pixels having leaky access switches. The leaky access switches allow charge to escape from the pixel over a row or column line in a pixel array, thereby corrupting the outputs of an entire row or column of pixels. A disclosed test involves (a) electronically setting a defined charge in a selected pixel of the CMOS imager; (b) reading the output of the selected pixel; and (c) comparing the output of the selected pixel to an expected value based upon the defined charge set in the selected pixels. If the output significantly deviates from the expected value, then the selected pixel is identified as having a leaky access switch. Preferably, a newly fabricated sensor is first tested as described. If such leaky access switch is discovered, the imager is discarded without incurring further manufacturing cost. If, on the other hand, the imager is not found to contain a leaky access switch, it may packaged and then subjected to an optical test.

31 Claims, 4 Drawing Sheets

CIRCUIT FOR DETECTING LEAKY ACCESS SWITCHES IN CMOS IMAGER PIXELS

BACKGROUND OF THE INVENTION

The present invention relates to an integrated circuit design for CMOS imagers. More specifically, the present invention relates to methods and apparatus for early detection of fatal faults in CMOS imagers.

CMOS image sensors are now becoming competitive with charge coupled device ("CCD") image sensors. Potential applications include digital cameras, night time driving displays for automobiles, and computer peripherals for document capture and visual communications.

Since the 1970s, CCD arrays have dominated the electronic image sensor market. They have outperformed CMOS array sensors in most important criteria including quantum efficiency, optical fill factor (the fraction of a pixel used for detection), charge transfer efficiency, readout rate, readout noise, and dynamic range. However, the steady improvement in CMOS technology (including increasingly small device size) has moved CMOS image sensors into a competitive posture. Further, in comparison to CCD technology, CMOS technology provides lower power consumption, increased functionality, and potentially lower cost. Researchers now envision single chip CMOS cameras having (a) integrated timing and control electronics, (b) a sensor array, (c) signal processing electronics, (d) an analog-to-digital converter, and (e) interface electronics. See Fossum, "CMOS Image Sensors: Electronic Camera On A Chip," 1995 IEDM Technical Digest, Wash. DC, Dec. 10–13, 1995, pp. 17–25 which is incorporated herein by reference for all purposes.

CCD arrays are limited in that all image data is read by shifting analog charge packets from the CCD array interior to the periphery in a pixel-by-pixel manner. The pixels of the CCD array are not randomly addressable. In addition, due to voltage, capacitance, and process constraints, CCD arrays are not well suited to integration at the level possible in CMOS integrated circuits. Hence, any supplemental processing circuitry required for CCD sensors (e.g., memory for storing information related to the sensor) must generally be provided on separate chips. This, of course, increases the system's cost.

A persistent problem of both CMOS and CCD image sensor technologies is image degradation due to faulty pixels. Such faulty pixels arise from processing variations inherent in fabrication of numerous sensor chips. A pixel's fault may be manifested by an output indicative of a radiation exposure that does not accurately reflect the actual radiation exposure to which the pixel was exposed. For example, a pixel that outputs more charge than is expected to be accumulated upon exposure to a particular amount of radiation appears as a bright spot in an image. Similarly, a pixel that outputs less charge than expected appears as a dark spot.

Typically, image sensors are optically tested after fabrication to identify the number of faulty pixels that they contain. If any sensor has more than a specified number of faulty pixels, it must be rejected. Thus, sensor yield is limited by the number of faulty pixels typically produced on a chip. Not surprisingly, wide area sensors having large numbers of pixels have relatively low yields because they tend to have higher numbers of faulty pixels (the number of faulty pixels per total number of pixels is approximately constant for a given fabrication technology).

Existing test procedures rely on optical procedures in which each pixel is exposed to radiation of the same intensity and then "read" to determine whether the pixel output significantly deviates from an expected value. If so, the pixel is deemed "faulty." Unfortunately, optical test procedures require fairly sophisticated equipment and can be difficult to conduct. Further, they may not accurately diagnose one type of particularly deleterious fault: the leaky access switch.

CMOS imagers include an array of pixels which are randomly addressable. Thus, each pixel is equipped with one or more access switches (usually MOS transistors) which allow independent access. For example in one array architecture, a pixel's output is read on a column line while all other pixels in that column are switched off. Unfortunately, the switch that controls the column access to a pixel (in such architecture) can leak. This has two detrimental effects. First, it causes the read-out from the pixel to be inaccurate (e.g., artificially low); some of the charge accumulated during exposure to radiation is leaked away before the pixel can be read. As a result, the pixel appears too dark in the resulting image. Second, and more seriously, the leaking charge finds its way onto the column line where it interferes with the output of every other pixel on the column. Hence, the leaky access switch corrupts not just the output of the pixel having the leaky switch, but the outputs of an entire pixel column or row. Typically, a CMOS imager having such leaky access switch must be discarded.

What is needed therefore is an improved image sensor design that can quickly and accurately identify CMOS image arrays containing a pixel with a leaky access switch.

SUMMARY OF THE INVENTION

The present invention provides a CMOS image sensor including circuitry for identifying leaky access switch type defective pixels. Preferably, the first test that a newly fabricated image sensor is subject to is an electronic test for leaky access switch pixels. This may be performed during electronic wafer sort ("ESW"). If such a leaky access switch is discovered, the imager is discarded without incurring further manufacturing cost. If, on the other hand, the imager is not found to contain a leaky access switch, it may packaged and then subjected to an optical test, or more expensive optical tests can be performed at the EWS level.

One aspect of the invention provides a particular method (implemented in a CMOS imager) for identifying a pixel having a leaky access switch. The method may be characterized as including the following sequence of events: (a) electronically setting a defined charge in a selected pixel of the CMOS imager; (b) reading the output of the selected pixel; and (c) comparing the output of the selected pixel to an expected value based upon the defined charge set in the selected pixel. If the output significantly deviates from the expected value, then the selected pixel is identified as having a leaky access switch. In this process, a delay should exist between when the charge is provided to the pixel and when that pixel's output is read. This allows ample time for the charge to escape from or enter into the pixel through the leaky access switch. The size of this delay should be roughly equal to the maximum expected exposure time of the sensor in use.

In general, the defined charge placed on the pixel must be an excess charge which will tend to escape over an output row or column line if the switch between the pixel and that line leaks. To adequately test for a leaky access switch, the defined charge set in the pixel may correspond to the pixel being exposed to a finite amount of radiation. That is, the charge set on the pixel will be equivalent to the amount of charge that would build up on the pixel when it is exposed to the defined intensity of radiation for a defined length of time. In the case where the pixel includes an n-well and a p-diffusion photodiode, excess holes are provided in the p-diffusion. Because the line connecting the pixel and a corresponding charge integrator is held at a low potential with respect to the diffusion, a leaky access switch will allow positive charge from the diffusion to leak onto the line.

For the test to be complete, the imager system will generally conduct steps (a) through (c) for all pixels in CMOS imager. Preferably, this full test is conducted prior to packaging the CMOS imager. If no pixels in the CMOS imager are found to include a leaky access switch, the system may conduct an optical test of the imager—possibly after packaging.

Another aspect of the invention provides a CMOS imager that may be characterized as including the following features: (a) one or more pixels capable of providing outputs indicative of a quantity or a type or both the quantity and type of radiation to which each of the one or more pixels has been exposed; (b) one or more voltage sources capable of delivering a voltage to the one or more pixels, which voltage corresponds to a test state of the pixels; and (c) one or more circuit elements electrically coupled to the one or more pixels and configured to identify pixels having leaky access switches in the CMOS imager.

In one preferred embodiment, the one more pixels each include a photodiode diffusion formed in a well and a tap to power or ground also formed in the well. If the pixel includes an amplifier for driving charge out of the pixel, it is termed an "active pixel." If it does not contain such amplifier, it is termed a "passive pixel." In either case, the pixels are preferably separately addressable. To read the outputs of these pixels, the one or more circuit elements may include one or more charge integrators.

The one or more voltage sources should be capable of supplying a voltage corresponding to an expected voltage resulting from exposure of the pixels to a defined quantity of radiation (beyond a dark state). Preferably, the voltage sources are coupled to the photodiode diffusions through one or more switches. When these voltage source switches are closed, the photodiode diffusions are electrically coupled to the voltage sources and when the switches are opened, the photodiode diffusions are electrically decoupled from the voltage sources.

The CMOS imager may also include an analog-to-digital converter capable of receiving analog outputs from said one or more pixels, converting the analog outputs to digital signals, and providing the digital signals to said one or more circuit elements such that the one or more circuit elements can identify pixels having leaky access switches. In especially preferred embodiments, the one or more voltage sources, the one or more circuit elements, and the analog-to-digital converter are all provided on a single integrated circuit chip.

Another aspect of the invention provides a system for producing an image of an object. This system includes a CMOS imager of the type described above and one or more components for directing an optical image onto the pixels. It may also include a mechanism for outputting an image resulting from the outputs of the one or more pixels. The image may be a photograph in the case of a digital camera for example.

These and other features and advantages of the invention will be described below in the Detailed Description section with reference to the appended drawings.

DETAILED DESCRIPTION OF THE PREFERRED EMBODIMENTS

The invention will be described with reference to certain preferred embodiments set forth below. Specifically, the invention will be described with reference to a particular sensor pixel design and a few variants. It should be understood that the invention is in no way specifically limited to these embodiments. For example, while that pixel design is presented as a "passive" design, it can in principle be applied to other designs such as active pixel designs.

Figure 1:
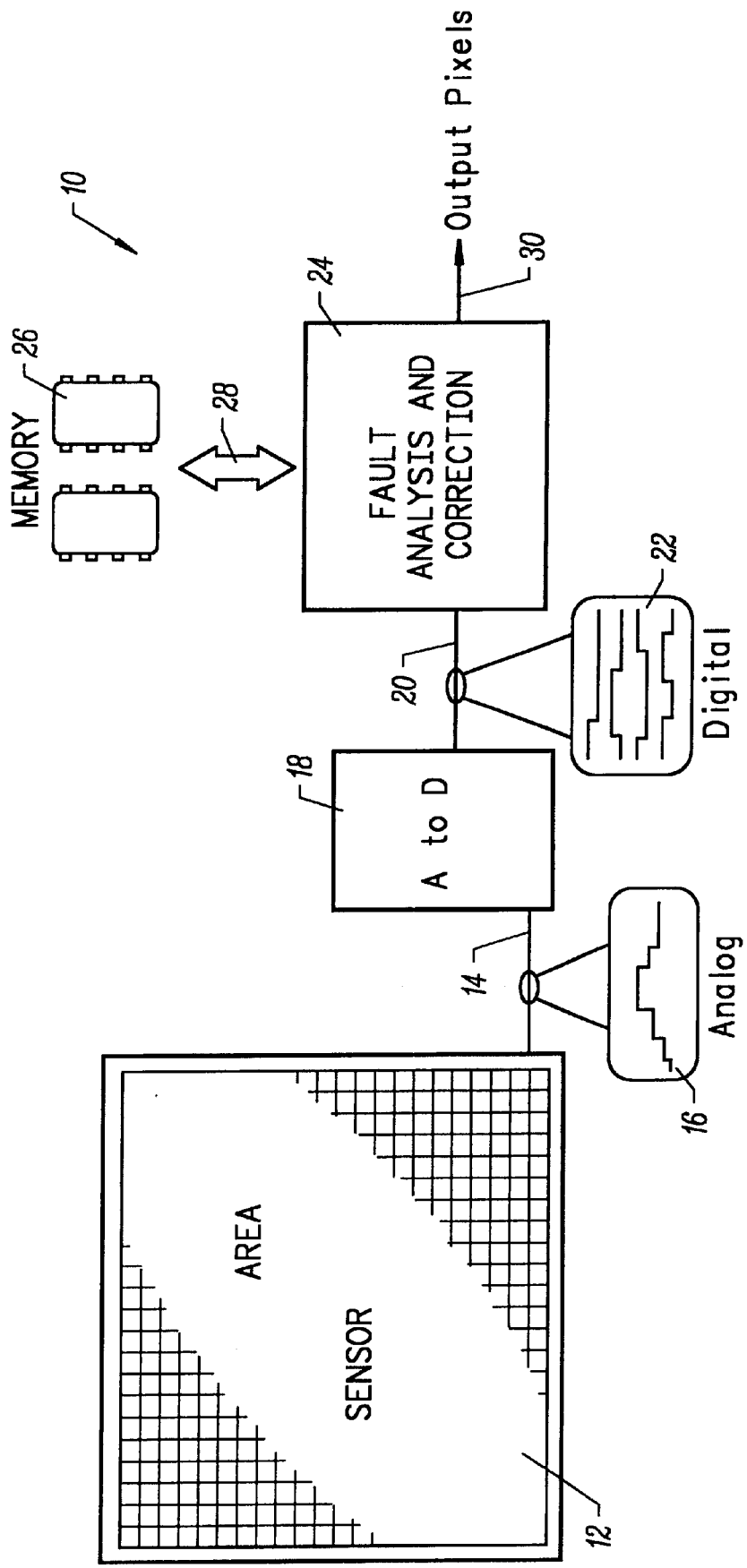
FIG. 1 is a block diagram illustrating the high level modules employed in a CMOS system implementing the fault tolerant imager of the present invention.

FIG. 1 presents one preferred system architecture for implementing a CMOS imager in accordance with this invention. Preferably, all elements of the depicted system are implemented on a single integrated circuit chip. The figure presents an imager 10 including four primary elements: a pixel array area sensor 12, an analog-to-digital converter 18, a fault analysis block 24, and an optional memory 26 for storing fault and correction data (typically for pixels corrupted by defects other than leaky access switches).

Area sensor 12 includes a plurality of regularly arranged pixels each capable of responding to radiation impinging on the sensor. Often, as in the case of most digital cameras, the radiation will be visible electromagnetic radiation. Detection of other types of radiation is within the purview of this invention. Each pixel produces an output indicative of the radiation intensity or integral of intensity with time (radiation integrated illumination) striking the pixel. In one specific embodiment, area sensor 112 includes an array of 1024 (vertical direction) by 1024 (horizontal direction) pixels, but of course the actual array dimensions will depend upon the application and the scale of the IC fabrication technology. In operation, an optical image may be directed onto area sensor 12 such that spatial and/or temporal variations in light intensity (or some other radiation feature such as wavelength) may be temporarily recorded by the individual pixels making up sensor 12.

The signals from the individual pixels of sensor 12 are output over one or more lines 14 as analog signals 16. These analog signals 16 are received by analog-to-digital converter 18 which converts them to digital signals 22 and outputs such digital signals over a line 20.

Digital signals 22 are then received by the fault analysis block 24 which may communicate with memory 26 over a memory connection 28 (e.g., a bus) in order to obtain information necessary to determine whether the pixels under test are faulty. For example, memory 26 may supply expected output values for comparison with actual output values.

While the individual elements of system 10 may be implemented on different physical structures, area sensor 12, analog-to-digital converter 18, and fault analysis block 24 are preferably provided on a single integrated circuit chip. In addition, it may be desirable to include memory 26 on the same chip. Memory 26 should be made as small as possible yet large enough to store all necessary information for identifying faulty pixels. Memory 26 may take various forms such as SRAM, ROM (EEPROM, flash memory, or EPROM), DRAM, etc.

It should be remembered, that other than area sensor 12, the other elements of FIG. 1 are only necessary in the cases where some pixel correction is to employed. If it is assumed that any sensor having a leaky access switch is to be discarded, then the various on-chip features described here are unnecessary.

One of the most significant benefits of CMOS-based image sensors is their easy integration with on-chip analog-to-digital converters. Preferably, the analog-to-digital converter will consume little power and occupy little area, yet meet the pixel processing rate at the resolution required of the system's application. It is possible to have a single analog-to-digital converter for the entire array (operating at a the pixel rate), a single converter for each pixel (operating at the frame rate), a converter for each column of the array (operating at the line rate), or some other division of labor.

Figure 2A:
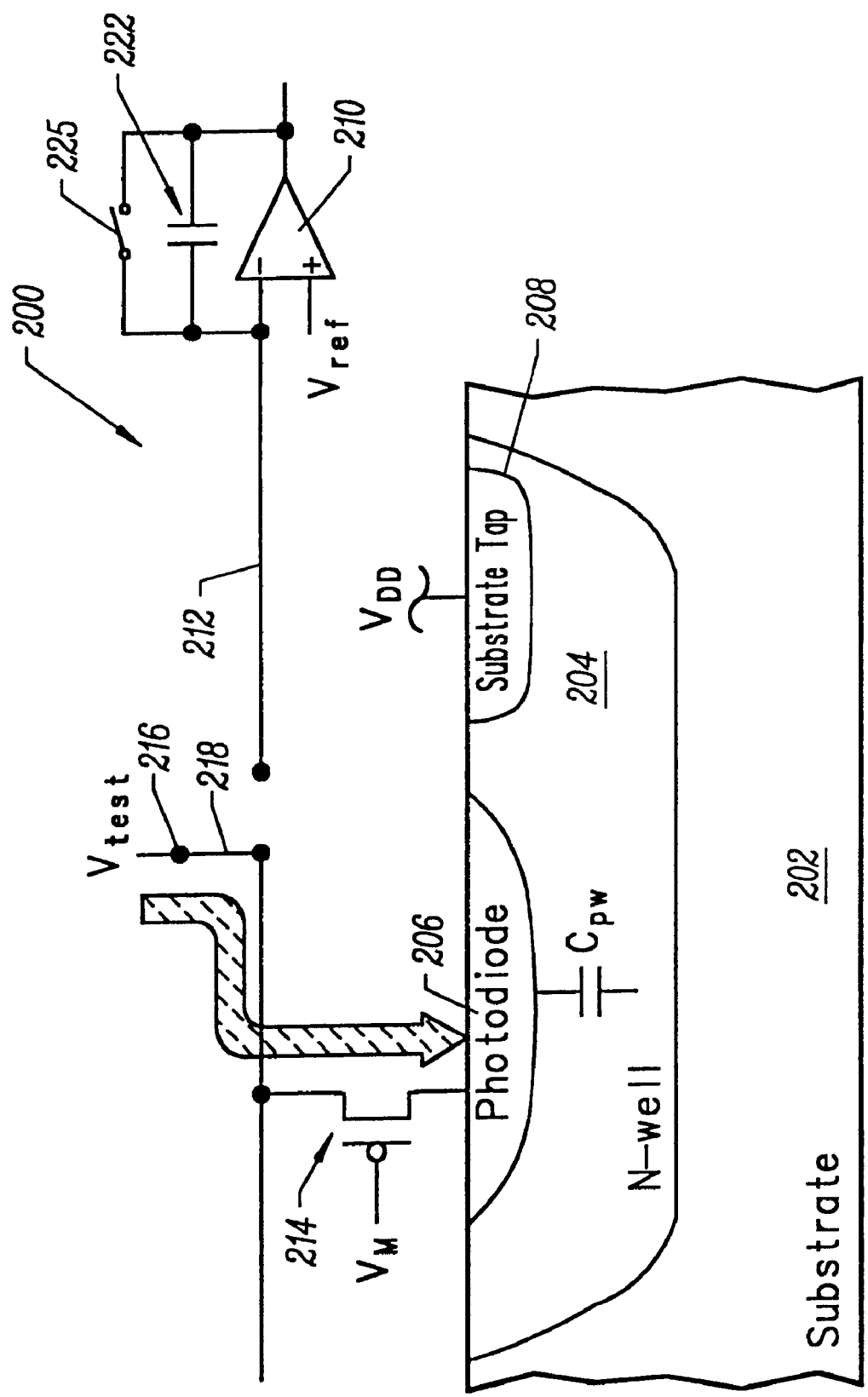
FIG. 2A is a cross-sectional diagram of a passive photodiode pixel being charged with a test charge in accordance with one embodiment of the present invention.
Figure 2B:
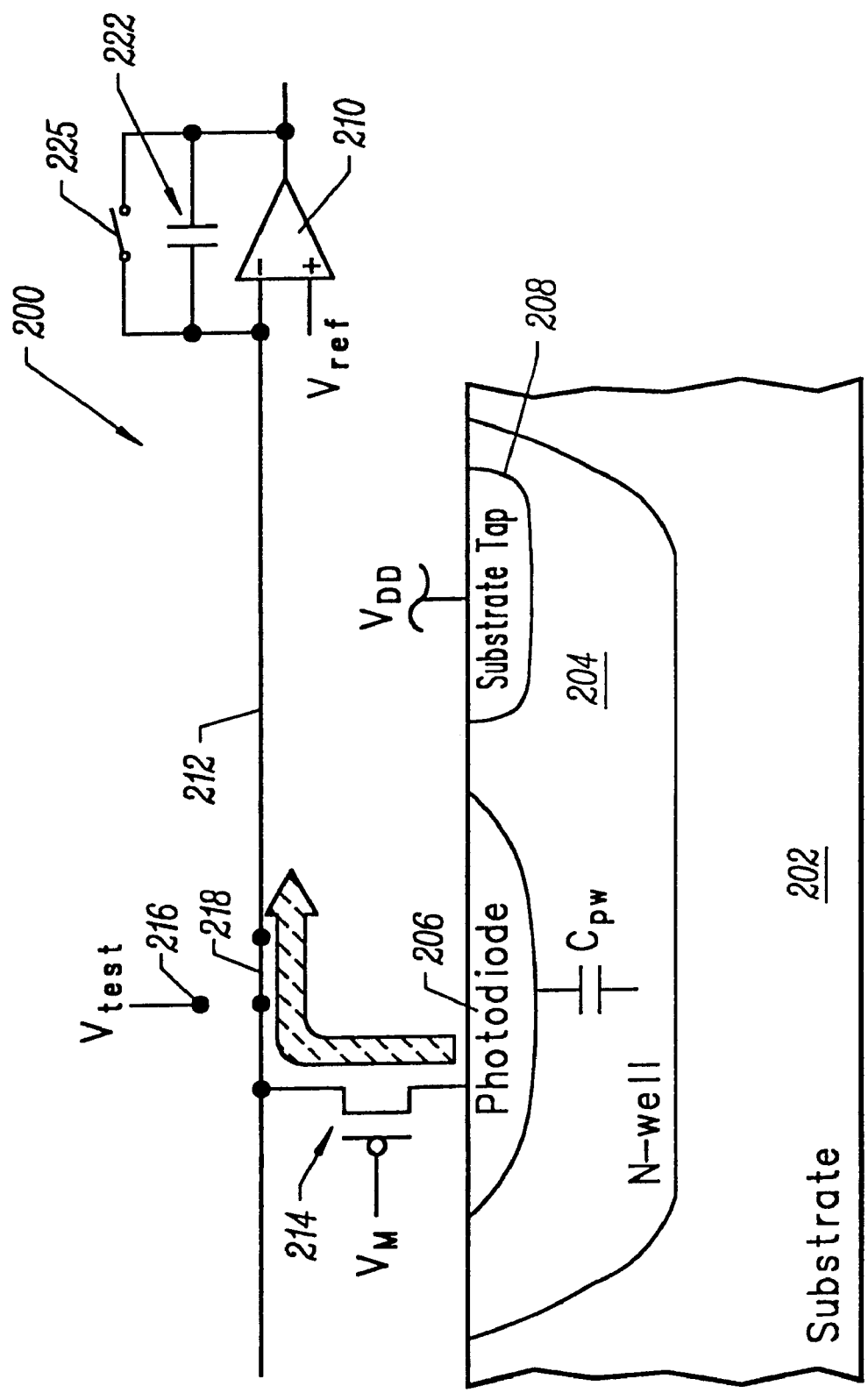
FIG. 2B presents the same cross-sectional diagram presented in FIG. 2A, but showing how the test charge on the pixel is read out to assess the pixel's quality.

FIGS. 2A and 2B present side sectional views of a single passive pixel. In FIG. 2A, a test charge is shown being applied to the pixel, and in FIG. 2B, that test charge is measured to determine whether the pixel has been corrupted. FIG. 2B also illustrates the state of a pixel when its output is being read for normal imaging.

As depicted in FIGS. 2A and 2B, a pixel 200 is formed on a semiconductor substrate 202. An n-well 204 is formed as a layer on the upper part of substrate 202, which may be an epitaxial layer for example. In a preferred embodiment, well 204 spans multiple pixels in a two-dimensional array. However, it is within the scope of this invention to have a separate well for each pixel. Within each pixel, a p-type photodiode diffusion 206 is provided to store charge upon exposure to radiation. In addition, each pixel 200 includes a substrate tap 208 for holding the well 204 at a fixed voltage such as $V_{dd}$. Substrate tap 208 may be a highly doped n-type region for providing a low resistance ohmic contact to well 204. Substrate tap 208 connects to an appropriate power source via an appropriate contact or interconnect.

Various optical layers/elements may be provided on pixel 200—at least on diffusion 206. To simplify the diagrams these additional elements are not shown in FIGS. 2A and 2B. These optical elements may include, for example, a lens for optical collection of photons and filters for wavelength discrimination of photons (as used in color pixels).

It should be understood that while pixel 200 is depicted as having an n-type well and a p-type photodiode diffusion, the invention is not limited to this arrangement. Thus, well 204 could be a p-type region and diffusion 206 could be an n-type region. In either case, the concentration of dopant atoms in regions 204 and 206 should be chosen to create a depletion mode photodiode. In such photodiodes, radiation impinging on photodiode diffusion 206 causes generation of holes and electrons in the depletion region. Because the depletion region does not contain free charge carriers, these newly created holes and electrons are not immediately annihilated by combination with carriers of the opposite charge. Electrons drift to well 204 and holes drift to p-diffusion 206 where they are collected as free charge on capacitor $C_{pw}$ 207 defined at the p-n junction between the photodiode diffusion 206 and the well 204. The capacitance of $C_{pw}$ is sometimes referred to as the photodiode's "intrinsic capacitance."

During normal operation, pixel 200 is exposed to a source of radiation for a defined period of time. The flux of radiation (intensity) integrated over the length of the exposure time defines an "integrated illumination" which is related to the amount of charge that builds up on the capacitor defined by the p-n junction of diffusion 206 and well 204. To "read" pixel 200, photodiode diffusion 206 is discharged so that the amount of stored charge can be determined. This charge specifies the integrated illumination which can be converted to an average radiation intensity based upon the known exposure time. The outputs of all pixels in the array are used to create a radiation intensity distribution or image.

In the illustrated embodiment, the pixel output is coupled to a charge integrator 210 by a connection line 212 and an access transistor 214. While photodiode diffusion 206 is exposed to radiation, access transistor 214 is switched off so that the charge accumulates in pixel 200. When pixel 200 is to be read, access transistor 214 switches on so that the charge accumulated in photodiode diffusion 206 can flow over connection line 212 to charge integrator 210 and a capacitor 222 (connected in parallel with amplifier 210). Charge integrator 210 then measures the voltage across capacitor 222 and generates an output corresponding to the quantity of charge received from photodiode diffusion 206. If access switch 214 leaks, the output of pixel 200 will appear to dark. Note that a switch 225 provided in parallel with capacitor 222 should be switched off during the read process so that a potential difference can be established across the plates of capacitor 222.

Concurrently with this reading process, photodiode diffusion 206 is "reset" to a "dark" state in which it is largely depleted of excess charge. In one example, in which $V_{dd}$ is 5V, photodiode diffusion 206 is reset to 1V which is the dark state (i.e., the voltage associated with no radiation being sensed by pixel 200). During reset, switch 225 is closed so that the reset voltage (the output of charge integrator 210) can be applied to line 212 and hence photodiode diffusion 206.

To this point, the description of pixel 200 does not substantially deviate from the description of a conventional pixel in a CMOS imager. As noted, the invention includes a fault analysis block 24. This block electronically determines if a given pixel is a faulty pixel. It may determine that a given pixel is faulty in various manners. Most importantly for detecting a leaky access switch, it will involve setting the pixel to a non-dark state of charge. This corresponds to the photodiode having excess charge which can leak out over one or more lines to charge integrators. The test pixel may be sampled at a later time to determine whether its voltage has deviated from that of a non-dark original state. Remember that on reset, a pixel photodiode is discharged such that the pixel assumes a voltage associated with the dark state (e.g., about 1V). To set the pixel to a non-dark state, a somewhat higher voltage should be provided to the photodiode. Typically, line 212 is held at a lower voltage. If, upon sampling the reset pixel, it is found that the pixel voltage drops from the initial value (i.e., charge leaked onto line 212), the pixel may be deemed faulty. In that case, the entire array may be deemed defective and be discarded.

Returning to FIG. 2A, a mechanism for testing pixels is depicted. In this embodiment, a source of test voltage 216 ($V_{test}$) is shown connected to connection line 212 via a switch 218 (e.g., an MOS transistor). While pixel 200 is not exposed to light, switch 218 is closed with respect to node 216, thereby connecting diffusion 206 to $V_{test}$. This allows diffusion 206 to be precharged to a test state. Note that during this process, the system must switch on access transistor 214 to allow charge to pass from node 216 to diffusion 206. The charge transferred during connection to test voltage $V_{test}$ simulates exposure of the pixel to a fixed illumination intensity for a fixed time.

Next, diffusion 206 is isolated from the readout line 212 by opening access switch 214. Then the readout line 212 is connected to charge integrator 210 by closing switch 218 with respect to line 212. The charge integrator should be in reset mode (i.e., switch 225 is closed). This clamps readout line 212 to the reset voltage, thereby allowing leaky access switch 214 to leak if it is defective. Note that as long as the readout line is held at $V_{test}$, there will be no test of leakage.

Now, the photodiode diffusion 206 is allowed to remain idle for a fixed length of time (preferably for a duration of about the time of the maximum exposure while in use). During this time, charge can leak through access switch 214 is it leaky, thereby reducing charge held in diffusion 206. After the requisite time has elapsed, charge on photodiode diffusion 206 is read-out through charge integrator 210 by closing access switch 214 while keeping switch 218 open with respect to node 216 (and closed with respect to charge integrator 210). Under these conditions, charge on photodiode diffusion 206 moves to capacitor 222 where it can be quantified by charge integrator 210 (see, FIG. 2B). Note that for the charge integrator to read stored charge, switch 225 must be opened. The associated detection circuitry then determines whether pixel 200 is corrupted (i.e., whether switch 214 is leaky). Note that voltage source 216 can provide any of a number of voltages, thereby allowing testing of many different light states. For example, voltage source 216 may supply a voltage of about 3V to simulate a moderate illumination and 4.5V to simulate more intense illumination.

Note that the embodiment shown in FIGS. 2A and 2B provides that switch 218 connects photodiode 206 to either Vtest node 216 or charge integrator 210, not both. This ensures that charge integrator 210 remains in a stable state. In an alternative embodiment, switch 218 may simply control a connection between photodiode 206 and node 216, without affecting the connection between photodiode 206 and charge integrator 210.

The output of charge integrator 210 will be an analog signal. In order to easily analyze this signal, the analog signal should first be converted to a digital signal. This is accomplished with analog-to-digital converter 18 as mentioned above. Preferably, A–D converter 18 is formed on the same chip with pixel array 12.

Figure 3:
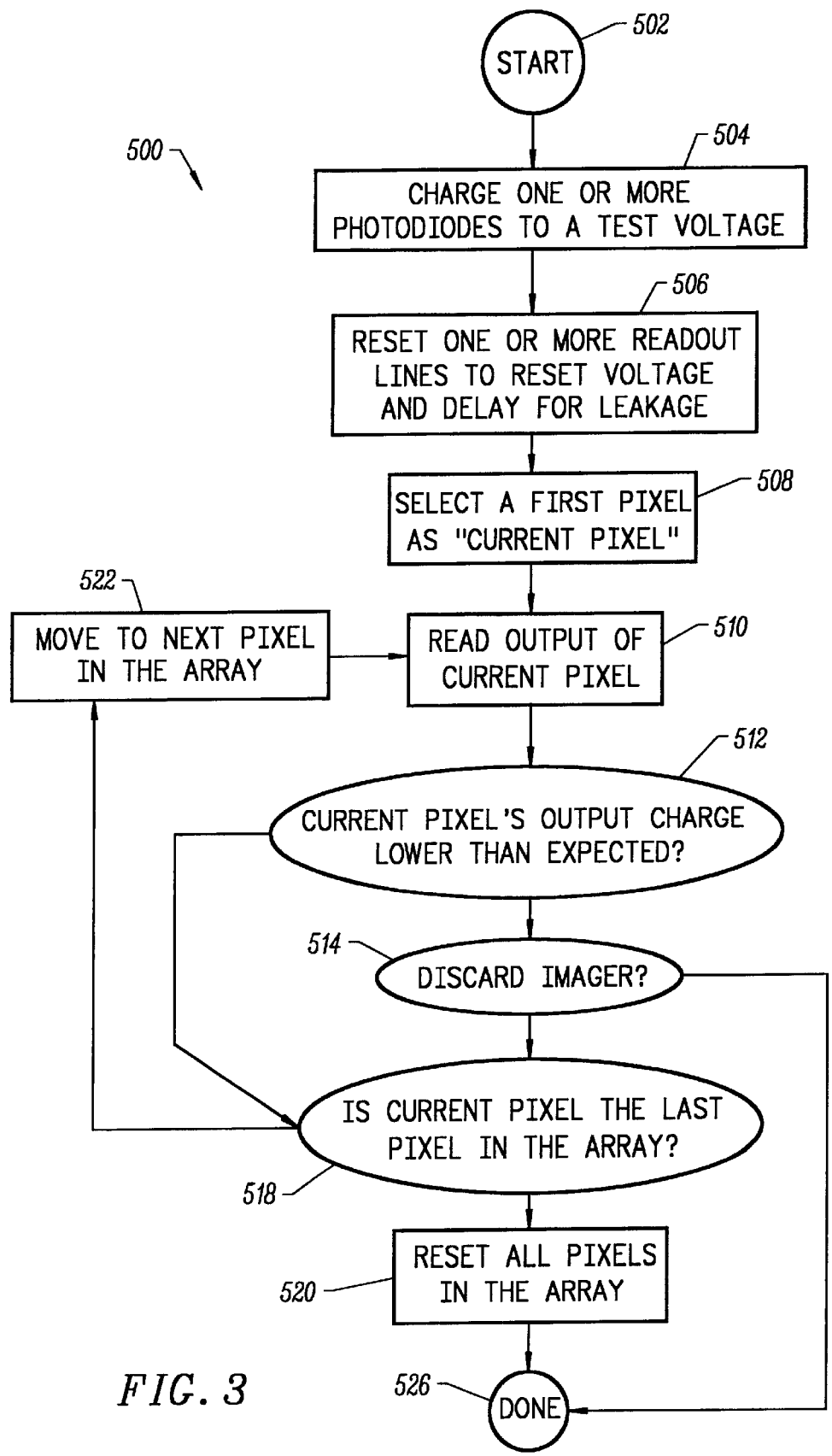
FIG. 3 is a process flow diagram illustrating a method by which the pixels of an array may be tested to determine whether they are corrupted.

FIG. 3 provides a process flow chart of a method 500 that may be employed to test pixels to determine if they are faulty. The process 500 begins at 502 and in a step 504, one or more photodiodes in an array are charged to a voltage, $V_{test}$, corresponding to exposure to a finite amount of radiation. Then, at a step 506, the readout lines corresponding to the pixels currently under test are reset to a reset voltage and the pixels are held at $V_{test}$ for a defined length of time (preferably corresponding to the length of time of maximum exposure while in use).

Next, at a step 508, fault analysis block 24 selects a first pixel to be evaluated. Evaluation involves determining an output voltage associated with the charge on that pixel at a step 510. Typcially, this output voltage is converted to an digital signal by analog-to-digital converter 18. From this digital value, logic block 24 determines whether the pixel has an actual output charge that is significantly less than the expected output charge. See step 512. At this point, logic block 24 determines if the pixel has a leaky access switch. Also, it may optionally determine the severity of the leakage.

Next, at a step 514 the system determines whether the imager is so defective that it should be discarded. In most instances, any corruption will result in the imager being discarded. However, in some embodiments, it may be desirable to keep the imager and attempt to correct its output to compensate for the defective pixel. This may be the case when the charge leaking is so small that it does not significantly effect the output of the other pixels on the column.

If the step 514 determines that the imager is to be discarded, the process is completed at 526. If however, the system determines that the imager containing the leaky access switch should be saved, block 24 determines whether the pixel under consideration is the last pixel in the array at a step 518. If so, all pixels in the array are reset at a step 520. The process is then completed at 526.

If decision step 518 is answered in the negative (i.e., the current pixel is not the last pixel in the array), the system moves to the next pixel in the array at a step 522. After that, process control returns to step 508 where the system accesses the output voltage of the new current pixel in the array.

Note that if decision step 512 is answered in the negative (i.e., the pixel under consideration is not corrupted), process control is directed to decision step 518 where the system determines whether the pixel under consideration is in fact the last pixel in the array.

In the test presented in FIG. 3, all pixels are charged and reset together, only readout is performed sequentially. This parallel approach to analysis has the advantage of being relatively rapid. In an alternative embodiment, the pixels are charged sequentially, in which case step 504 would have to be repeated for each pixel until the last pixel has been tested (i.e., step 518 is answered in the negative).

Preferably, a leaky access switch test such as that described with reference to FIG. 3 is performed in conjunction with standard electrical wafer sort (EWS) testing. As known to those of skill in the art, EWS identifies electrically defective die before they are packaged.

In the rare instance where a leaky access switch is identified but the imager is not discarded, correction may take various forms. Methods for correcting or masking a single defective pixel are described in U.S. patent application Ser. No. 08/964,763 (attorney docket no. SGSTP009/97-B-068) filed on the same day as the instant application, entitled "Pixel Correction System and Method for CMOS Imagers," and naming R. Rambaldi, M. Tartagni, and A. Kramer, as inventors. That application is incorporated herein by reference for all purposes. As mentioned, a leaky access switch will affect not only the pixel having the leaky access switch but all pixels on its row or column. Typically, only in those cases where the leakage is so small that it negligibly affects other pixels, will the imager be saved. In those cases, the correction technique will be employed to only the pixel having the leaky access switch. More infrequently, an imager may be salvaged even when the leaky access switch significantly impacts all pixels on its row or column. In these cases, a correction technique must be applied to all pixels in the column. For example, an interpolation technique may be employed for each pixel in the row or column of the leaky access switch. Output values from two neighboring pixels on "good" rows or columns may be employed in the interpolation. Alternatively, if the amount of leaky charge is known, its effect on each pixel can be calculated or measured. Then during image generation, the excess charge on the pixels of the bad column could be subtracted out.

If the test process is concluded and no leaky access switches are located, it will typically be desirable to conduct an optical analysis. This will indicate whether any of the pixels are obstructed by a dust particle or other item. In an especially preferred embodiment, the optical test is performed after the imager has been packaged. While obstructions may be present before packaging, packing may introduce its own optical defects. Any leaky access switches, however, will generally be present before the device is packaged. Because any leaky access switches generally require that the device be discarded, it will usually make sense to perform the above described leaky access switch test before packaging.

At the conclusion of the leaky access switch test and any optical tests, the system stores the location of the corrupted pixel(s) (and possibly some information as to how the corrupted pixel can be masked) in optional memory 26. The defective pixel may result from a leaky access switch, an obstruction, etc.

The CMOS imagers of this invention may be deployed in various systems for military, scientific, business, and home applications. For example, they may be used in digital cameras, video recorders, night driving displays, etc. Generally, the systems will include, in addition to the CMOS imager chip, optics to capture an image and direct it onto the CMOS array. This may include one or more lenses, filters, etc. of the types conventionally employed in image capture systems. The optics and CMOS imager will be mounted in a casing such as a camera case. The system will also include some mechanism for outputting the image(s) from the CMOS imager to a display system such as a printer, an LCD screen, a plasma display, or a CRT display (together with associated printing and display electronics and/or software). The output mechanism may include appropriate data buses connectors and possibly cabling. Further, the system may include a memory for temporarily storing captured images for later downloading to the display system. In some instances, the display system itself will form part of the overall imager system. The ultimate output may take the form of an image on a display screen, a photograph, a printed page, a display on a window forming part of operating machinery such as an automobile, airplane, etc.

Although the foregoing invention has been described in some detail for purposes of clarity of understanding, it will be apparent that certain changes and modifications may be practiced within the scope of the appended claims. For example, while the specification has described certain pixel and chip architectures which accomplish the objectives of the present invention, many others which will be understood by those of skill in the art from the present disclosure to be within the spirit of the present invention may equally be used. For example, while the specification has exemplified a passive pixel, other pixel types such as active pixels (of photodiode or photogate type) containing on-pixel amplifiers. also could benefit from use with the invention. In addition, the broad fault correction methods of this invention could profitably find use in non-CMOS technologies such as CCD technology, but the various system features might have to be implemented on separate chips. Therefore, the present embodiments are to be considered as illustrative and not restrictive, and the invention is not to be limited to the details given herein, but may be modified within the scope of the appended claims.

What is claimed is:

1. In a CMOS imager, a method of identifying a defective pixel, the method comprising:
    (a) electronically setting a defined charge in a selected pixel of the CMOS imager, the defined charge corresponding to the pixel being exposed to a defined amount of radiation;
    (b) reading the output of the selected pixel;
    (c) comparing the output of the selected pixel to an expected value based upon the defined charge set in the selected pixels, whereby if the output significantly deviates from said expected value, identifying the selected pixel as having a defect;
    (d) conducting (a) through (c) for all pixels in CMOS imager; and
    (e) conducting an optical test of the imager if no pixels in the CMOS imager are found to have a defect.

2. The method of claim 1, wherein electronically setting a defined charge in the selected pixel comprises resetting the selected pixel to a state corresponding to a dark value in an image.

3. The method of claim 1, wherein electronically setting a defined charge in the selected pixel comprises setting the selected pixel to a state corresponding to a non-dark value in an image.

4. The method of claim 1, wherein the pixel includes an n-well and a p-diffusion photodiode and wherein electronically setting a defined charge in the selected pixel comprises injecting a quantity of charge into the p-diffusion.

5. The method of claim 4, wherein the selected quantity of charge sets the pixel to a state corresponding to a non-dark value in an image.

6. The method of claim 1, wherein (a) through (c) are conducted before packaging the CMOS imager.

7. The method of claim 1, further comprising converting the output of the selected pixel from an analog format to a digital format prior to comparing it to the expected value.

8. A method for identifying a defective pixel associated with a CMOS imager, the method comprising:
    electronically setting a defined charge in a randomly addressable pixel associated with a CMOS imager, the defined charge corresponding to the pixel being exposed to a defined amount of radiation, wherein the randomly addressable pixel is charged through a closed access switch which allows independent access to the pixel;
    opening the access switch while coupling the pixel to a measurement device, wherein the defined charge is allowed to leak out over a line to charge the measurement device;
    measuring the charge that has leaked out over the line through the open access switch by reading the output of the measurement device to identify a defect.

9. The method of claim 8, wherein the measurement device is an integrator.

10. The method of claim 8, wherein electronically setting a defined charge in the randomly addressable pixel comprises resetting the randomly addressable pixel to a state corresponding to a dark value in an image.

11. The method of claim 8, wherein electronically setting a defined charge in the randomly addressable pixel comprises setting the randomly addressable pixel to a state corresponding to a non-dark value in an image.

12. The method of claim 8, wherein the pixel includes an n-well and a p-diffusion photodiode and wherein electronically setting a defined charge in the randomly addressable pixel comprises injecting a quantity of charge into the p-diffusion.

13. The method of claim 8, further comprising converting the output of the randomly addressable pixel from an analog format to a digital format.

14. The method of claim 8, further comprising:
  resetting the measurement device after measuring the charge that has leaked out over the line through the open access switch;
  closing the access switch to thereby electrically connect the pixel to the measurement device to allow charge in the pixel to flow over the line to the measurement device.

15. The method of claim 14, further comprising:
  measuring the charge that has flowed over the line to the measurement device through the closed access switch;
  determining if the charge that has flowed through the closed access switch significantly deviates from an expected valued corresponding to the defined charge.

16. The method of claim 15, wherein the selected quantity of charge sets the pixel to a state corresponding to a non-dark value in an image.

17. The method of claim 15, further comprising conducting an optical test of the CMOS imager.

18. A CMOS imager, comprising:
  a voltage source configured to charge a pixel of the CMOS imager to a defined charge, the defined charge corresponding to the pixel being exposed to a defined amount of radiation;
  a detection circuitry configured to read charge levels flowing from the pixel;
  an access switch associated with a pixel of the CMOS imager, the access switch variably coupling the pixel to either the voltage source or the detection circuitry, wherein the access switch is closed to allow the voltage source to provide the defined charge to the pixel and subsequently opened to allow charge to leak out over a line to the detection circuitry.

19. The CMOS imager of claim 18, wherein the pixel includes an n-well and a p-diffusion photodiode and wherein charging the pixel to a defined charge comprises injecting a quantity of charge into the p-diffusion.

20. The CMOS imager of claim 18, wherein the defined charge sets the pixel to a state corresponding to a non-dark value in an image.

21. The CMOS imager of claim 18, wherein the detection circuitry is an integrator.

22. The CMOS imager of claim 21, wherein the access switch variably couples the pixel to either the voltage source or the detection circuitry through a toggle switch.

23. The CMOS imager of claim 22, wherein the detection circuitry is reset after measuring charge that has leaked out over the line to the detection circuitry through the open access switch.

24. The CMOS imager of claim 23, wherein the access switch is closed after the detection circuitry is reset to thereby electrically connect the pixel to the detection circuitry to allow charge in the pixel to flow over the line to the detection circuitry.

25. The CMOS imager of claim 24, wherein the detection circuitry is coupled to an analog-to-digital converter.

26. In a CMOS imager, a method for characterizing an access switch associated with a pixel, the method comprising:
  (a) electronically setting a defined charge in a selected pixel of the CMOS imager, the defined charge corresponding to the selected pixel being exposed to a defined amount of radiation;
  (b) reading an output of the selected pixel; and
  (c) comparing the output of the selected pixel to an expected value based upon the defined charge set in the selected pixel, whereby if the output is substantially similar to said expected value, identifying the selected pixel as having an access switch that is not leaky, wherein an access switch that is not leaky provides independent access to the selected pixel when the selected pixel is exposed to radiation.

27. The method of claim 26, wherein electronically setting a defined charge in the selected pixel comprises resetting the selected pixel to a state corresponding to a dark value in an image.

28. The method of claim 26, wherein electronically setting a defined charge in the selected pixel comprises setting the selected pixel to a state corresponding to a non-dark value in an image.

29. The method of claim 26, further comprising:
  conducting (a) through (c) for all pixels in CMOS imager.

30. The method of claim 26, wherein the selected pixel includes an n-well and a p-diffusion photodiode and wherein electronically setting a defined charge in the selected pixel comprises injecting a quantity of charge into the p-diffusion.

31. The method of claim 30, wherein the selected quantity of charge sets the pixel to a state corresponding to a non-dark value in an image.

* * * * *